United States Patent [19]

Johannesen et al.

[11] 4,358,003
[45] Nov. 9, 1982

[54] DISC BRAKE HAVING A CALIPER SUPPORTED BY ROLLERS

[75] Inventors: Donald D. Johannesen; Joseph R. Williamson, both of South Bend, Ind.

[73] Assignee: The Bendis Corporation, Southfield, Mich.

[21] Appl. No.: 173,582

[22] Filed: Jul. 30, 1980

[51] Int. Cl.³ .......................................... F16D 55/224
[52] U.S. Cl. ................................................. 188/73.43
[58] Field of Search ................... 188/72.1, 72.4, 73.43, 188/73.44, 73.45

[56] References Cited

U.S. PATENT DOCUMENTS 4,211,310 7/1980 Lüpertz ........................... 188/73.43

Primary Examiner—Duane A. Reger
Attorney, Agent, or Firm—Paul David Schoenle; Ken C. Decker

[57] ABSTRACT

A floating-caliper disc brake (10) includes a non-rotating torque member (36). A caliper (22) straddles the brake disc (12) and is carried in fixed radial and circumferential position by the torque member (36). Axial movement of the caliper (22) relative to the brake disc (22) is provided for by roller members (58) between the caliper (22) and the torque member (36). The torque member (36) and the caliper (22) both have axially-extending grooves (52, 54) which in registry cooperate to define axially-extending apertures (56) between the caliper and the torque member. The roller members (58) are received in the axially-extending apertures (56) between the caliper (22) and the torque member (36). The roller members (58) are the sole torque-transmitting structure between the caliper (22) and the torque member (36). Rolling of the caliper (22) on the roller members (58) provides for axial movement of the caliper (22) relative to the brake disc (12) and the torque member (36).

1 Claim, 5 Drawing Figures

DISC BRAKE HAVING A CALIPER SUPPORTED BY ROLLERS

The invention relates to a floating caliper disc brake.

Floating caliper disc brakes include a rotor having friction faces on opposite sides thereof and a caliper cooperating with a pair of friction elements to urge the pair of friction elements into engagement with the friction faces on the rotor to retard rotation of the rotor when a brake application is effected. A non-rotating torque member carries the caliper in substantially fixed radial and circumferential position relative to the rotor. The caliper is movable, or floats, axially to a limited extent relative to the rotor and torque member.

A disc brake is known in accordance with U.S. Pat. No. 4,084,665 to Burnett in which the torque member includes a pair of circumferentially spaced arms which carry the caliper between them. The caliper and arms both define cooperating abutments which transfer brake torque from the caliper to the torque member. The caliper is restrained from movement relative to the torque member in the radial direction by a pair of pins which are inserted into axially-extending apertures defined between the torque member and caliper. Matching grooves or slots in the torque member and caliper, when placed in registry, define the apertures. Limited axial movement of the caliper relative to the disc is made possible by sliding of the caliper along the pins.

A brake application is effected by a fluid motor carried by the caliper. When the fluid motor is supplied with a pressurized fluid, it forces one of the friction elements against a friction face of the brake disc. Reaction forces acting through the caliper cause the caliper to slide axially relative to the torque member and rotor so that the other friction element is forced against the other friction face of the brake disc.

With a brake of the kind illustrated in the Burnett patent, brake torque is transferred from the caliper to the torque member solely by the cooperating abutments of the caliper and torque member arms. Because the abutment surfaces of the caliper and torque member frictionally engage each other, the caliper resists being moved axially by the reaction forces incident to a brake application. Further, corrosion of the abutment surfaces causes additional resistance to axial sliding of the caliper relative to the torque member, with the result that an equal and even application of force to the friction elements is not achieved upon a brake application. In the brake disclosed in the Burnett patent, an attempt has been made to space apart the abutment surfaces in the brake release condition by the use of elastomeric rings on the pins so that corrosion of the abutment surfaces does not interfere with sliding of the caliper. Upon an application of the brake, the resilient elastomeric rings are distorted and the abutment surfaces contact and transfer brake torque to the torque member. However, spacing apart of the abutment surfces facilitates the entrance of moisture, dirt, and other contamination between the abutments, which contamination promotes corrosion of the abutment surfaces and may accumulate to the point that the caliper is prevented from sliding.

A further consideration with prior disc brakes is that because friction forces inhibit axial movement of the caliper, one of the friction elements may remain in frictional engagement with the brake disc even though the fluid motor is not supplied with a pressurized fluid. Ideally, the runout, or wobble, of the brake disc would serve to space the friction elements from the friction faces of the brake disc. Runout is present in all brake discs due to bearing clearances and imperfections in the disc. Additionally, the bearing clearances allow a slight axial movement of the disc relative to the torque member which carries the caliper. The combination of runout and axial movement of the disc relative to the caliper incident to vehicle operation should position the caliper axially relative to the disc so that the friction elements do not drag on the disc when the brake is not applied. However, because friction prevents the caliper from being readily moved axially relative to the torque member, one of the friction elements may drag on the rotating brake disc. The frictional drag created on the rotating disc by the dragging friction element causes increased rolling resistance for the vehicle. An increase in vehicle fuel consumption results from the increase in rolling resistance. Additionally, when the vehicle turns a corner, the cornering forces are transmitted from the road to the vehicle chassis through the vehicle suspension. The cornering forces result in the take up of bearing clearances and in small distortions of the vehicle suspension structures. Because the disc brake is usually mounted to the vehicle suspension structures, these small distortions and movements result in the brake disc being moved axially relative to the caliper. If friction between the caliper and the torque member resists axial movement of the caliper relative to the torque member, the brake disc is forced against one of the friction elements. Consequently, vehicle rolling resistance is increased during turns. Vehicle tire wear is adversely affected by increasing rolling resistance.

The invention as claimed is intended to remdey the drawbacks of prior disc brakes. The design of our invention permits the caliper to move readily, or in other words, substantially without friction, in the axial direction because the caliper is supported by a plurality of roller members. The roller members are received in axially-extending apertures between the caliper and the arms of the torque member. Cooperating grooves in the caliper and in the torque member define the axially-extending apertures. Braking torque developed by the friction elements and transferred to the caliper during a brake application is transferred to the torque member solely by the roller members.

In order to accommodate the axial movement of the caliper, which must occur as the friction elements wear, without the necessity of providing for corresponding axial movement of the roller members, a stop is provided at one end of the grooves defined in the arms of the torque member. As the caliper moves axially relative to the torque member responsive to wear of the friction elements, the roller members stack up against the stop until sliding motion takes place between the caliper and the roller members. The sliding motion occurs in step-wise fashion upon a brake application. Upon completion of the brake application, the caliper is again free to move axially on the roller members without any sliding movement. The sliding movement of the caliper relative to the roller members adjusts the relationship of the caliper and rollers relative to the torque member so that the caliper is free to move axially a small distance by rolling on the roller members. As a result, the caliper is axially movable responsive to brake disc runout and to suspension structure distortions. The larger axial movement of the caliper necessitated by friction element wear takes place as step-wise sliding movements during the service life of the friction elements. By providing for step-wise movement of the caliper relative to the torque member, the axial dimension of our disc brake is kept to a minimum.

A further feature of our invention follows from the support of the caliper on roller members. Prior floating-caliper disc brakes have embodied compromises between the need for ready axial movement of the caliper and the need for substantially complete restraint of the caliper in the radial and circumferential directions. Our brake avoids these compromises. Because the roller members provide an extremely low coefficient of rolling friction responsive to axial movement of the caliper, the rollers may be preloaded to eliminate radial and circumferential clearance between the caliper and the torque member. Consequently, the caliper is completely restrained from movement in the radial and circumferential directions relative to the torque member.

Preloading of the roller members is accomplished by utilizing the torque member as a spring. In order to assemble the caliper into the opening between the arms of the torque member, the torque member arms are forced slightly apart and the caliper and roller members are inserted between the arms. The arms of the torque member are released. As a result, the arms spring toward one another to preload the roller members. Radial and circumferential clearances between the caliper and torque member are eliminated. Despite this zero-clearance method of assembly, the caliper can readily move axially by rolling on the roller members.

The advantages offered by the invention are mainly that the caliper moves axially relative to the brake disc responsive to very low axial forces so that the friction elements do not drag on the brake disc when the brake is not applied; the axial dimension of the brake compares favorably to prior floating-caliper type disc brakes; and rattling of the caliper between the arms of the torque member is prevented because our zero-clearance method of assemblying the brake eliminates radial and circumferential clearances.

One way of carrying out the invention is described in detail below with reference to drawings which illustrate two embodiments, in which.

Figure 2:
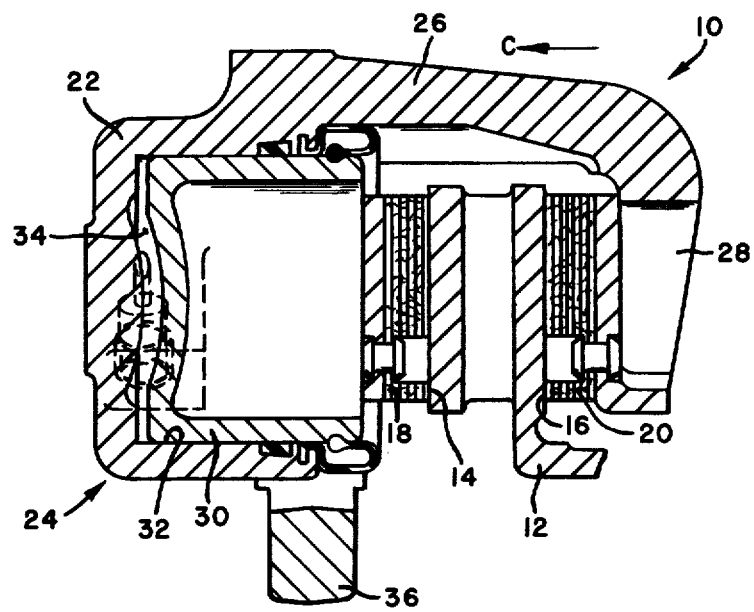
FIG. 2 is a cross-sectional view taken substantially along line 2—2 of FIG. 1.

Referring to FIG. 2, a disc brake indicated generally by the numeral 10 includes a rotor 12 rotatable with an axle assembly (not shown) and having a pair of opposed friction faces 14 and 16. A pair of friction elements, 18, 20 are disposed adjacent the friction faces 14 and 16, respectively. The friction elements 18 and 20 are urged into braking engagement with their corresponding friction faces 14 and 16 when a brake application is effected. A caliper 22 includes a fluid motor portion 24 disposed adjacent the friction face 14, a bridge portion 26 that traverses the periphery of the rotor 12, and a radially inwardly extending reaction portion 28 which is disposed adjacent the face 16. The fluid motor portion 24 includes a piston 30 slidably arranged in a bore 32 defined within caliper 22. Fluid is communicated to the variable volume chamber 34 defined between the end of the piston and corresponding end of the bore 32 when a brake application is effected, to urge the piston 30 toward the rotor 12. When the brake is subsequently released, the piston 30 is returned to its brake-release position.

Figure 1:
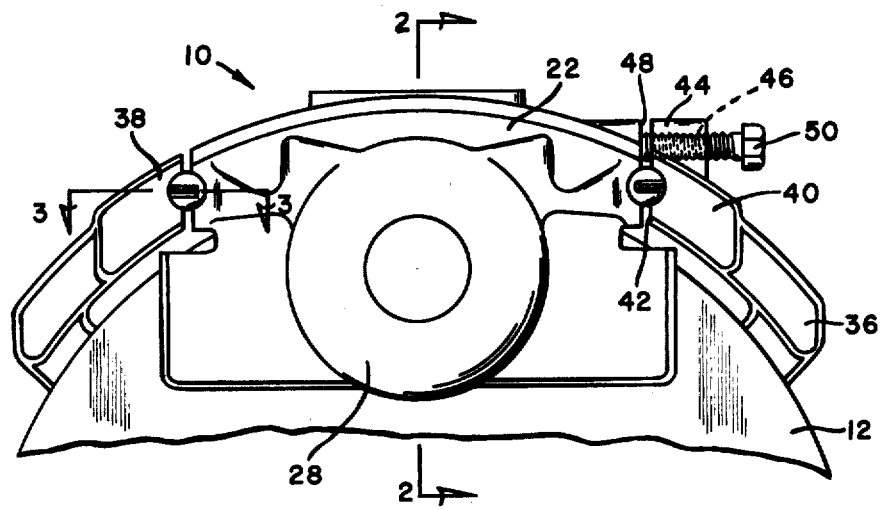
FIG. 1 is a fragmentary side elevation of a disc brake made pursuant to the present invention.

Turning to FIG. 1, the caliper 22 is mounted for axial movement with respect to the rotor 12 by a torque member 36, which is secured to a non-rotating portion of the axle assembly (not shown). The torque member 36 includes a pair of circumferentially spaced arms 38, 40 that define a recess 42 therebetween.

Viewing FIG. 1, it will be seen that the caliper arm 40 includes an upward-projecting boss 44 having a threaded bore 46 therein. Caliper 22 defines an abutment surface 48 which is substantially perpendicular to the axis of bore 46. A cap screw 50 threadally engages the bore 46 so that the left end of the cap screw 50 is engageable with the abutment surface 48.

Since the caliper mounting area of torque member 36 is symmetrical, the circumferentially spaced arms 38, 40 are similar, and therefore only the arm 38 will be described in detail, it being understood that the arm 40 is symmetrically opposite the arm 38.

Figure 3:
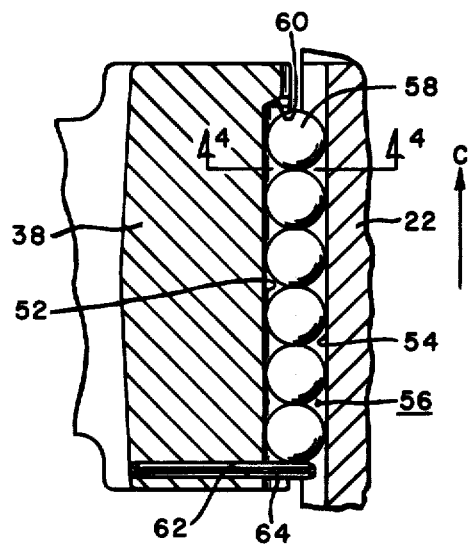
FIG. 3 is a cross-sectional view taken substantially along line 3—3 of FIG. 1.
Figure 4:
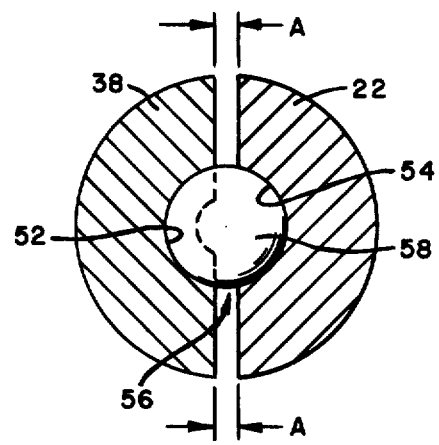
FIG. 4 is an enlarged cross-sectional view taken substantially along line 4—4 of FIG. 3.

Turning now to FIGS. 3 and 4, the torque member arm 38 and the caliper 22 include matching semi-circular slots or grooves 52, 54 respectively. Slots 52, 54 when placed in registry with each other, define a substantially circular aperture 56 which extends axially between the arm 38 and caliper 22. In accordance with the invention, a plurality of spherical roller members, or balls 58, are disposed in the aperture 56 between the arm 38 and caliper 22. Roller members 58 are substantially unyielding. The depth of the grooves 52 and 54 coincides with the diameter of the roller members 58 so that the caliper 22 is spaced from the torque member arm 38. A clearance A is defined between the torque member arm 38 and caliper 22.

Viewing FIG. 3, it will be seen that the torque member arm 38 defines an abutment 60 at the upper end of the aperture 56. Because of the abutment 60, the roller members 58 are not movable upward through the aperture 56, viewing FIG. 3. At the lower end of aperture 56, viewing FIG. 3, the torque member defines a bore 62 which communicates with the groove 52. A rolled metal pin 64 is removably received in the bore 52. Pin 64 projects radially into the aperture 56. Consequently, the roller members 58 are not movable downward out of aperture 56, viewing FIG. 3. The spacing between the abutment 60 and pin 64 is greater than the combined diameters of the roller members 58. As a result, the caliper 22 is movable axially relative to the torque member 36 (vertically in FIG. 3) by rolling on the roller members 58.

Turning again to FIG. 1, it will be recalled that the cap screw 50 is engageable with the abutment surface 48 on the caliper 22. During the assembly of brake 10, the caliper 22 is inserted into the recess 42 between the arms 38 and 40 of the torque member 36. The roller members 58 are then inserted into the aperture 56 between the torque member arm 38 and the caliper 22. Consequently, the caliper 22 defines the clearance A with the torque member arm 38. The caliper 22 and the torque member arm 40 define a clearance which is less than A. Cap screw 50 is threaded into the bore 46 and against the abutment surface 48 to force the caliper 22 away from the torque member arm 40. As a result, the arms 38 and 40 of the torque member 36 are forced apart. Cap screw 50 is threaded into the bore 46 and against the abutment surface 48 until the torque member arm 40 and caliper 22 define a clearance which is greater than A. Roller members 58 are inserted into the aperture 56 between the caliper 22 and the torque member arm 40. The cap screw 50 is unscrewed from the bore 46 to allow the arms 38 and 40 to spring toward one another. The roller members 58 between the torque member arm 40 and caliper 22 cause the caliper and torque member arm 40 to define the clearance A. As a result, the torque member 36 preloads the roller members 58 in apertures 56 on both sides of the caliper 22. Preloading the roller members 58 substantially eliminates the possibility of radial or circumferential movement of the caliper 22 relative to the torque member 36.

Figure 5:
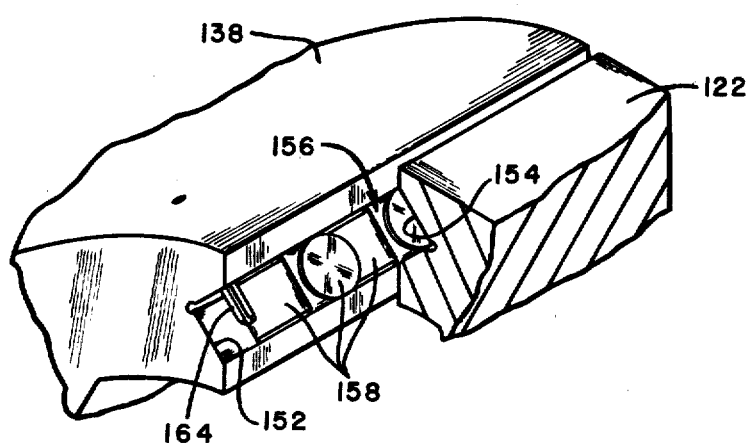
FIG. 5 is a fragmentary perspective view, partly in cross-section, of an alternative embodiment of our invention.

FIG. 5 illustrates an alternative embodiment of our invention in which features analogous in function to those of the embodiment illustrated by FIGS. 1–4 are referenced by the same numeral increased by one hundred. Upon insertion of FIG. 5, it will be noted that the grooves 152 and 154, which are defined on the torque member arm 138 and on the caliper 122, respectively, are V-shaped. Consequently, the aperture 156 defined by the grooves 152 and 154 is substantially square in cross-section. The roller members 158 which are disposed in the aperture 156 are cylindrical. Each roller member 158 has its cylindrical axis oriented perpendicular to the axes of the adjacent roller members. Those skilled in the art will recognize that the length of the roller members 158 is slightly less than the diameter of the roller members. Consequently, the parallel surfaces of grooves 152 and 154 are spaced apart by the diameters of roller members 158.

When a brake application is effected, high pressure fluid is admitted into the variable volume chamber 34 where it urges the piston 30 toward the friction face 14, thereby urging the friction element 18 into frictional engagement with the friction face 14. As is well known in the art, reaction forces acting through bridge 26 and the reaction portion 28 of the caliper 22 will also urge the friction element 20 into frictional engagement with the friction face 16 to brake or retard the rotation of the rotor 12.

Viewing FIG. 3, the reaction forces acting through bridge 26 move the caliper 22 in the direction indicated by the arrow C when a brake application is effected. In view of the zero-clearance fit of roller members 58 in apertures 56, the caliper 22 is substantially prevented from moving radially and circumferentially relative to the torque member 36. However, the caliper 22 is readily movable in the axial direction by rolling on the roller members 58. By way of example, the caliper 22 may move axially in the direction of arrow C from 1.02 mm. (0.040 inch) to 1.52 mm. (0.060 inch) upon a brake application. The corresponding movement of the roller members 58 toward the abutment 60 is from 0.51 mm. (0.020 inch) to 0.076 mm. (0.030 inch). Therefore, the abutment 60 and pin 64 are sufficiently spaced apart to allow the roller members to roll within the groove 52 upon a brake application. Of course, the caliper returns to its brake-release position when the pressurized fluid is released from chamber 34 because of runout and axial movement of the brake disc 12.

Torque developed by friction elements 18, 20 during a brake application and transferred to caliper 22 is transferred from the caliper to roller members 58 and hence to torque member 36.

As the friction element 20 wears during a brake application, the caliper 22 moves in the direction of arrow C, viewing FIGS. 2 and 3. For example, if 6.35 mm. (0.250 inch) of wear is permitted on the friction element 20 before the friction element must be replaced, the caliper 22 will move to the left, viewing FIG. 2, 0.250 inch during the service life of the friction element 20. The corresponding axial movement of roller members 58 in groove 52 would be 3.175 mm. (0.125 inch). Of course, the wear of friction element 20 is gradual and occurs during successive brake applications. Viewing FIG. 3, as the caliper 22 moves in the direction of arrow C responsive to wear of the friction element 20, the roller members 58 roll in the groove 52 and stack up against the abutment 60. When a brake application is effected with the roller members 58 stacked up against the abutment 60 the hydraulic motor 24 forces the caliper 22 to move in the direction of arrow C. Because the roller members 58 are stacked up against the abutment 60, the roller members can not roll. As a result, the caliper 22 slides relative to the roller members 58. When the brake application is terminated, the caliper 22 is movable axially in the direction opposite to arrow C by rolling on the roller members 58. Thus, it will be understood that upon the termination of a brake application the friction element 18 is spaced from the brake disc 12 because the piston 30 returns to its brake-release position. Further, the friction element 20 is spaced from the brake disc because of brake disc runout and axial movements of the brake disc which cause the caliper to move to the right, viewing FIG. 2. Because the caliper is movable axially responsive to relative light rubbing contact between the brake disc and the friction elements, substantial friction forces are not developed between the brake disc and the friction elements in the brake release condition. Brake disc runout, bearing clearances, and distortions of the vehicle suspension structure are all accommodated by rolling of the caliper axially on the roller members 58.

Those skilled in the art will recognize that by providing the abutment 60 so as to cause step-wise sliding movement of the caliper 22 on the roller members 58, the axial dimension of our brake is kept to a minimum. Of course, our invention is not limited to embodiments which provide for step-wise sliding of the caliper 22. Alternative embodiments of our invention which will suggest themselves to those skilled in the art may provide for the entire axial movement of the caliper 22 by rolling of the caliper 22 on the roller members 58.

We claim:
1. A disc brake comprising:
a rotor having friction faces on opposite sides thereof and rotatable about an axis perpendicular to the plane of said rotor;
a caliper cooperating with a pair of friction elements to urge the pair of friction elements into engagement with the friction faces on the rotor to retard rotation of said rotor;
a non-rotating torque member including a pair of circumferentially-spaced arms which define a recess therebetween, said caliper being received in said recess, said torque member arms having axially-extending grooves in registry with corresponding axially-extending grooves in said caliper, said grooves cooperating to define a pair of axially-extending apertures between said torque member arms and said caliper;
a plurality of roller members disposed within said apertures between said torque member arms and said caliper, said caliper being supported by and spaced from said torque member arms by said roller members, whereby said caliper is free to move axially relative to said torque member by rolling on said roller members but is otherwise substantially prevented from movement in the radial and circumferential directions by said roller members;

said roller members being received between said caliper and the arms of said torque member substantially without radial and circumferential clearance, said caliper and said torque member including cooperating means for forcing said torque member arms apart, and said cooperating means includes an abutment defined on said caliper and a projection on said torque member, said projection defining a threaded bore with threadably receives a member which is engageable with said abutment.

* * * * *